United States Patent [19]
Vodicka et al.

[11] Patent Number: 6,096,407
[45] Date of Patent: Aug. 1, 2000

[54] BUILT-IN PACKING FOR MATERIAL EXCHANGE AND/OR HEAT EXCHANGE BETWEEN GASES AND LIQUIDS

[75] Inventors: Vladimir Vodicka, Bochum; Arno Katzmann, Hattingen, both of Germany

[73] Assignee: GEA Energietechnik GmbH, Bochum, Germany

[21] Appl. No.: 09/124,883

[22] Filed: Jul. 31, 1998

[30] Foreign Application Priority Data

Aug. 1, 1997 [DE] Germany ............................ 197 33 480

[51] Int. Cl.[7] .................. B32B 1/00; B01D 47/00
[52] U.S. Cl. ............... 428/175; 428/131; 428/178; 428/182; 428/184; 261/112.2; 261/DIG. 72
[58] Field of Search ................ 428/174, 182, 428/184, 177, 114, 105, 175, 131, 116, 166, 178, 193; 261/112.2, DIG. 72

[56] References Cited

U.S. PATENT DOCUMENTS 4,579,693  4/1986  Wigley .................................. 428/184
4,800,047  1/1989  Monjoie ................................ 428/177

*Primary Examiner*—Donald Loney
*Attorney, Agent, or Firm*—Friedrich Kueffner

[57] ABSTRACT

A built-in packing for the material exchange and/or heat exchange between gases and liquids is composed of a plurality of undulating lattice-like elements arranged next to each other and each mounting element has channels formed by the undulations extending at an angle relative to the vertical direction and extending parallel to each other, wherein the channels of always two adjacent mounting elements intersect each other. Continuous longitudinal struts are provided at the bottom of the channels, wherein the longitudinal struts have contact plates at the ends thereof, and wherein the contact plates are components of an upper and a lower horizontal closed edge strip. The longitudinal struts are connected through transverse struts in a framework-like manner, wherein the transverse struts extend in horizontal planes which extend parallel to the two edge strips.

17 Claims, 5 Drawing Sheets

BUILT-IN PACKING FOR MATERIAL EXCHANGE AND/OR HEAT EXCHANGE BETWEEN GASES AND LIQUIDS

BACKGROUND OF THE INVENTION

1. Field of the Invention

The present invention relates to a built-in packing for the material exchange and/or heat exchange between gases and liquids.

2. Description of the Related Art

A built-in packing of the above-described type is mounted with a plurality of additional built-in packings, for example, in a wet cooling tower, in such a way that water to be cooled can travel from the top toward the bottom, on the one hand, and that cooling air can travel through the built-in packings in a transverse flow and/or counter-current flow, on the other hand.

Various built-in packings of this type composed of undulating plate-like or foil-like mounting elements are explained in German Patent 23 22 683. All of these mounting elements have closed surfaces on which the water to be cooled flows down in thin layers. For interrupting the tendency of the formation of a stream-like flow or thread-like flow, it is also known in this connection to provide holes or projections, wherein these holes or projections may be arranged in or on the surfaces or also in the corner areas of the undulations.

However, independently of whether the channels formed by the undulations extend horizontally, vertically or obliquely, closed water layers are always in principle in a heat-exchanging contact with the cooling air. This inevitably limits the heat-exchange efficiency.

Another property of the known types of construction is the fact that they are sensitive to dirt. Cleaning of the mounting elements in the assembled state is essentially not possible.

Moreover, DE 41 11 451 C2 discloses dripping or trickling mounting elements in the form of tubular bodies which are combined to form packet-like elements. The tubular bodies are severed with a length corresponding to the height or the width of the element from a continuously manufactured tubular lattice body formed by intersecting strands, and the lattice bodies which are in contact with each other are connected rigidly to each other at least at their end faces.

In these dripping or trickling mounting elements, the helically shaped strands also contact the water which flows down on them. The individual points of intersection of the strands have the purpose of causing the individual water streams flowing along the strands to be divided and reunited.

SUMMARY OF THE INVENTION

Therefore, it is the primary object of the present invention to provide a built-in packing for the material exchange and/or heat exchange between gases and liquids which is insensitive against dirt while providing a high heat exchange efficiency, and which can be manufactured and assembled easily.

In accordance with the present invention, the built-in packing of the above-described type is composed of a plurality of undulating lattice-like mounting elements arranged next to each other and each mounting element has channels formed by the undulations extending at an angle relative to the vertical direction and extending parallel to each other, wherein the channels of always two adjacent mounting elements intersect each other. Continuous longitudinal struts are provided at the bottom of the channels, wherein the longitudinal struts have contact plates at the ends thereof, and wherein the contact plates are components of an upper and a lower horizontal closed edge strip. The longitudinal struts are connected through transverse struts in a framework-like manner, wherein the transverse struts extend in horizontal planes which extend parallel to the two edge strips.

Accordingly, at the core of the invention is the formation of identical lattice-like mounting elements in a filigreed configuration. As a result of the channels formed with large-area interruptions by the undulations, wherein the channels extend at an angle relative to the vertical direction and the channels of two mounting elements which are arranged next to each other but rotated by 180 degrees about a vertical axes intersect each other, there are essentially no longer any surfaces on which, for example, in a wet cooling tower, water to be cooled can flow in layers or streams. Rather, the filigreed configuration of the mounting elements and the resulting framework of a built-in packing causes any water droplet dropping down from the water distribution to be divided into many small water droplets in the area of the upper edge strip when it impinges on the edge strips, on the longitudinal struts and on the transverse struts, and these small water droplets, in turn, are flung against each other and against the longitudinal struts and the transverse struts and, thus, the volume of the droplets is reduced to such an extent that an essentially mist-like fluid bed is formed in the built-in packing which is supported by the cooling air. In this manner, a very large heat exchange surface is provided which, consequently, leads to a high heat exchange efficiency.

The filigreed configuration of the mounting elements provides the additional advantage that the built-in packing composed of these elements is insensitive to dirt and can be cleaned off even in the assembled state by means of high-pressure water jets. The necessary stiffness is ensured by the longitudinal struts which extend in the bottom of the channels and which are in contact with the longitudinal struts of the adjacent mounting elements, and by the transverse struts as well as the contact plates forming component parts of the two edge strips at the ends thereof. Two adjacent mounting elements are additionally connected to each other through the contact plates.

In accordance with a feature of the present invention, the channels of the mounting elements extend at an angle of 10 degrees to 80 degrees relative to the vertical direction. However, taking into consideration aspects of manufacturing technology, it is advantageous if the channels extend at an angle of 30 degrees relative to the vertical direction.

In accordance with another feature, each connection point of a longitudinal strut with a transverse strut is connected through diagonal struts to the connection points of an adjacent longitudinal strut with the transverse struts extending in the adjacent horizontal planes. This increases the stiffness of each mounting element and further improves the mist-like turbulence of trickling water desired especially in a wet cooling tower in order to achieve a large heat exchange surface area. Thus, the diagonal struts produce additional intersecting reinforcements between two connection points located above each other of two adjacent longitudinal struts and transverse struts. These reinforcements formed by the diagonal struts essentially form together with the transverse struts the filigreed walls of the channels between the longitudinal struts.

In accordance with another feature, the transverse struts and the diagonal struts each are Z-shaped or have a zigzagshaped configuration, wherein each Z-shaped strut has a longer middle portion and two end portions substantially shorter than the middle portion, and wherein the end portions are located in the vertical planes in which the longitudinal struts of each mounting element also extend. This configuration contributes to an increase of the stiffness of each mounting element, without impairing the filigreed construction. In addition, this configuration makes easier to manufacture the mounting elements, particularly when injection molding the mounting elements.

The longitudinal struts, the transverse struts, as well as the diagonal struts may have a round cross-section.

However, in accordance with an advantageous feature, the longitudinal struts have a rectangular cross-section. The greater side length of the cross-section then extends transversely of the longitudinal direction of the longitudinal struts.

In accordance with another feature, the transverse struts have a square cross-section. In addition, the thickness of the transverse struts is smaller than that of the longitudinal struts.

In accordance with a particularly useful feature, the diagonal struts have a wedge-shaped cross-section. This also facilitates the manufacture of the mounting elements in accordance with the injection molding method.

The contact plates serving for the connection of two adjacent mounting elements in the upper and lower edge strips of each mounting element have a rectangular configuration, wherein the longitudinal axes extend in the vertical direction. This type of arrangement provides the result that the front surfaces of the contact plates can be utilized as a contact area of two mounting elements.

In accordance with another feature, the contact plates are not only connected to the longitudinal struts, but also are connected to each other through horizontal connecting struts. These connecting struts preferably extend in the areas of the upper or lower transverse edges of the contact plates. In this manner, the upper edge of the upper edge strip and the lower edge of the lower edge strip are formed by the free transverse edges of the contact plates and by the free end edges of the connecting struts.

In accordance with another feature, the edge strips are further stiffened by connecting the connecting struts through hockey stick-like vertical struts to the transverse struts located in the adjacent horizontal planes. This configuration further makes it possible that the vertically extending portions of the edge strips can be injection molded with the areas of the channels.

In order to provide additional connecting areas between two adjacent mounting elements also in the vertical middle area of the mounting elements, another feature provides that the connection points of the longitudinal struts with the transverse struts and possibly also with the diagonal struts in the middle vertical range are enlarged to form support surfaces.

Since, in accordance with a preferred embodiment, the mounting elements are of synthetic material, another feature of the present invention provides that two adjacent mounting elements are welded together through the contact plates. The support surfaces are then also preferably welded together.

In accordance with another embodiment of the connection between two mounting elements, the two adjacent mounting elements are connected to each other through plug-type connections at the contact plates. For this purpose, successive contact plates in the edge strips can be provided alternatingly with a plug and a corresponding locking recess. This type of connection can also be provided at the support surfaces in the middle vertical range of the mounting elements.

In order to make it possible that the mounting elements can be manufactured as mass-produced articles by injection molding, the mounting elements are of polyethylene, preferably high density polyethylene.

On the other hand, the mounting elements may also be of polypropylene.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
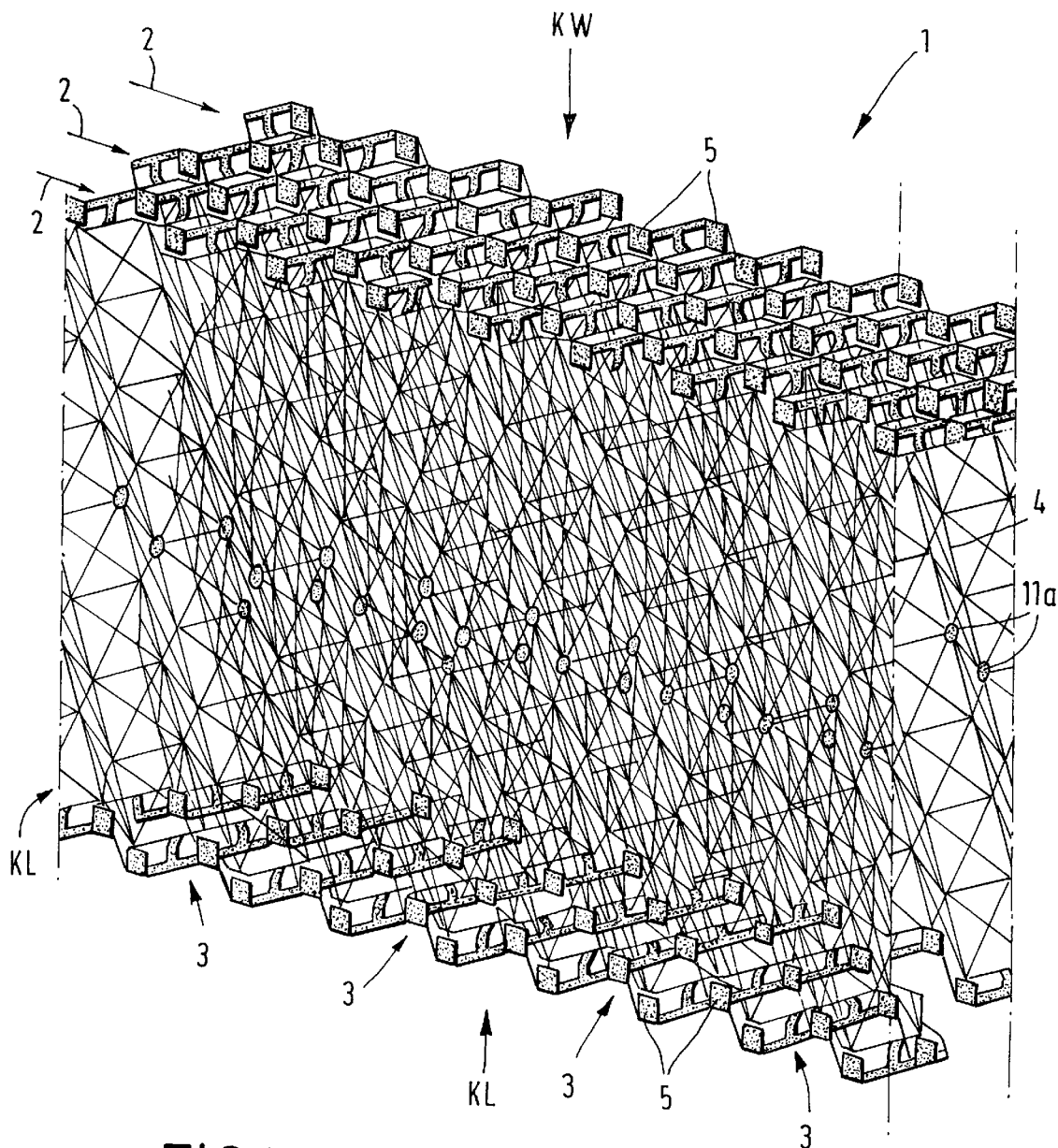
FIG. 1 is a schematic perspective view of a portion of a built-in packing for a wet cooling tower.

FIG. 1 shows a portion of a built-in packing 1 for a wet cooling tower, not shown in detail.

The built-in packing 1 is composed of a plurality of undulated lattice-like mounting elements of injection-molded high-density polyethylene, wherein the mounting elements 2 are arranged next to one another.

The built-in packing 1 is integrated together with a plurality of additional built-in packings into a wet cooling tower in such a way that water to be cooled can travel from above through the arrangement in accordance with arrow KW and cooling air flows in a counter-current flow or transverse flow through the arrangement in accordance with arrows KL.

Figure 2:
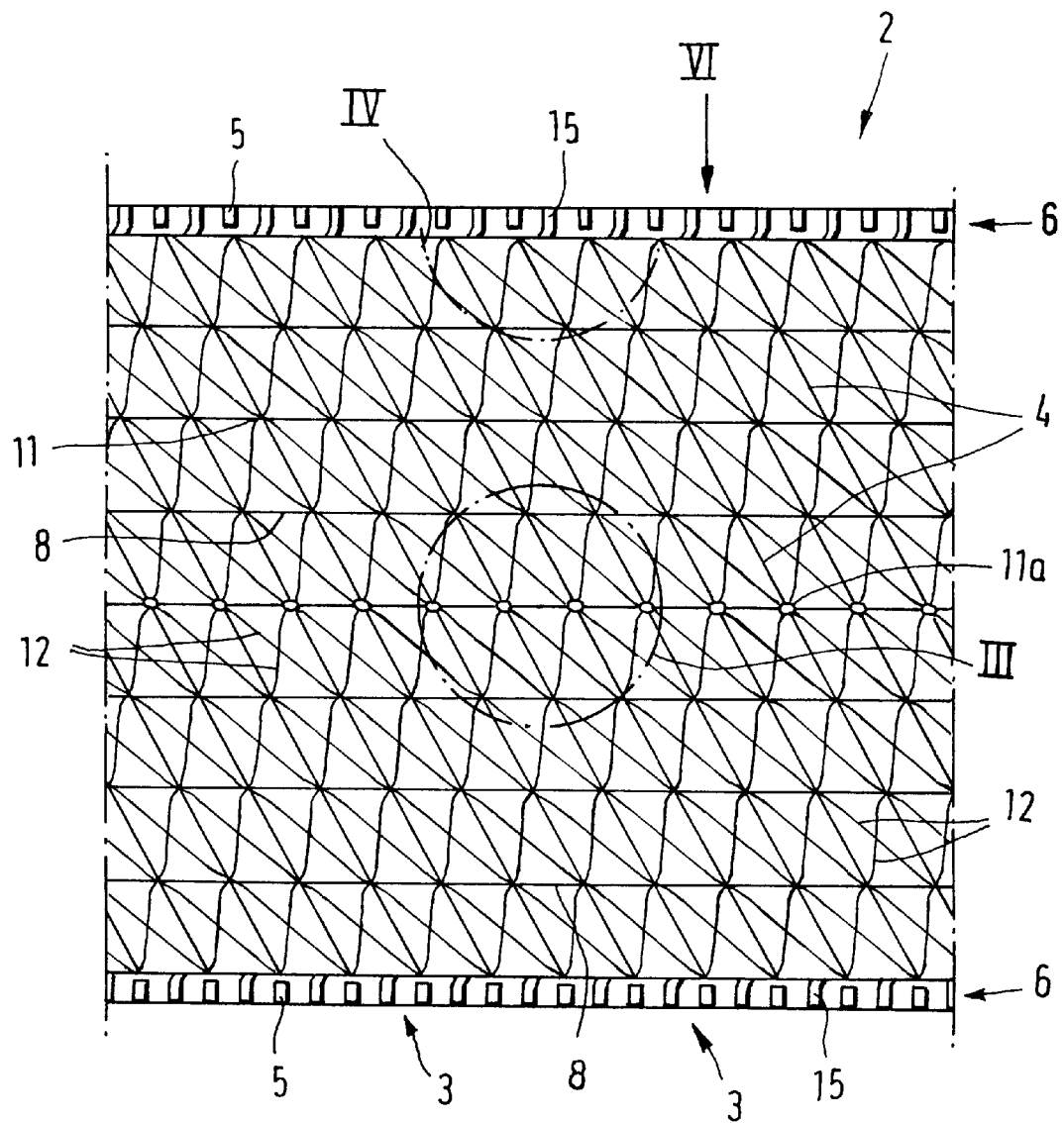
FIG. 2 is a schematic front view, on a larger scale, of a mounting element of the built-in packing of FIG. 1.
Figure 2:
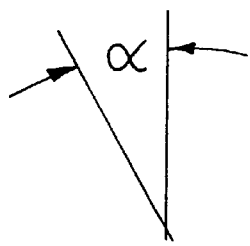

The mounting elements 2 forming the built-in packing 1 are of identical construction. As can be seen especially in connection with FIGS. 2 through 5, the undulations form channels 3 which extend in a straight line and parallel to each other at an angle of 30 degrees relative to the vertical direction as particularly shown in FIG. 2. Extending along the bottom of each channel 3 is a continuous longitudinal strut 4 having a rectangular cross-section. The longer side of the rectangular cross-section extends transversely of the channels 3. The ends of the longitudinal struts 4 are connected to rectangular contact plates 5 whose longitudinal axes extend vertically. The contact plates 5 form component parts of upper and lower closed edge strips 6. For this purpose, two adjacent contact plates 5 are joined together through connecting webs 7. These connecting webs 7 extend along the upper and lower transverse edges of the contact plates 5, so that the end faces of the contact plates 5 extend in the same horizontal planes as the end faces of the connecting web 7, as can be seen in FIGS. 2, 4 and 6.

The longitudinal struts 4 are connected to each other through transverse struts 8 having a square cross-section. The transverse struts 8 extend in horizontal planes which extend parallel to the two edge strips 6. The transverse struts are Z-shaped in the longitudinal direction thereof with a longer middle portion 9 and two shorter end portions 10, as illustrated in FIG. 5. The end portions 10 are located in the vertical planes in which are the longitudinal struts 4 also extend.

Connection points 11 are formed where the longitudinal struts 4 meet the transverse struts 8. Each connection point 11 of a longitudinal strut 4 with a transverse strut 8 is additionally connected through diagonal struts 12 to the connection points 11 of an adjacent longitudinal strut 4 with the transverse struts 8 extending in the adjacent horizontal planes. In this manner, intersecting or cross-shaped stiffening means are formed between two adjacent longitudinal struts 4 and between two adjacent transverse struts 8. The diagonal struts 12 also have a Z-shaped configuration in the longitudinal extension thereof with a longer middle portion 13 and two shorter end portions 14, as can be seen in FIG. 5. The end portions 14 are also located in the vertical planes of the longitudinal struts 4. The diagonal strut 12 has a wedge-shaped cross-section.

Figure 4:
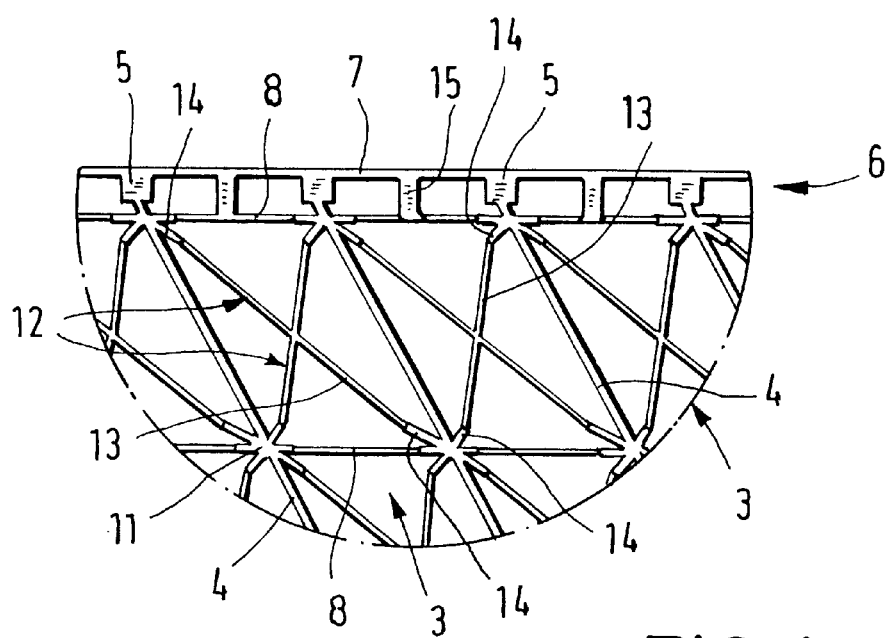
FIG. 4 is an illustration, on an even larger scale, of detail IV of FIG. 2.
Figure 5:
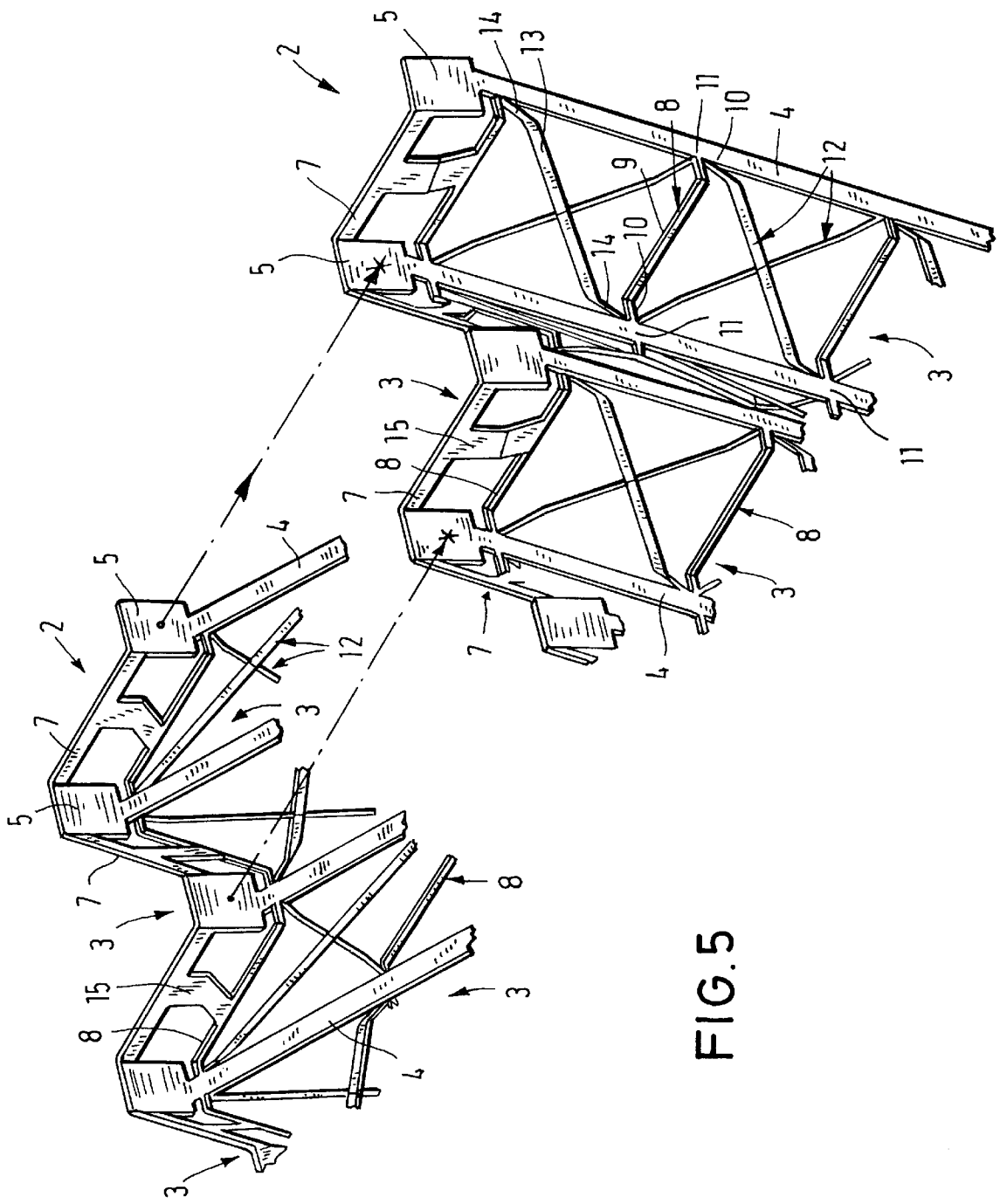
FIG. 5 is an exploded view of portions of two mounting elements arranged next to each other.
Figure 6:
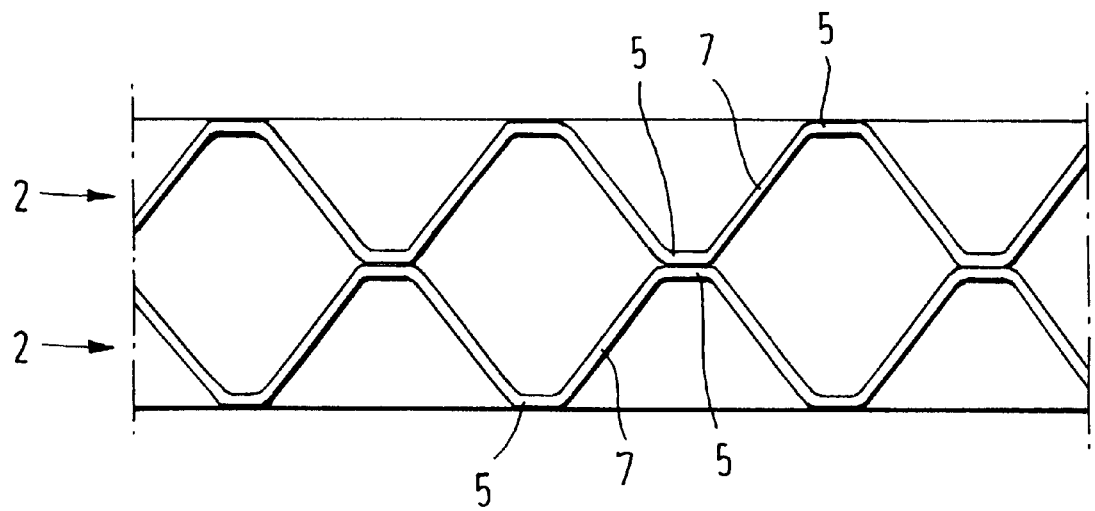
FIG. 6 is a partial top view, on a larger scale, as seen in the direction of arrow VI of FIG.2.

As can be seen particularly in FIGS. 4 and 5, the connecting webs 7 between the contact plates 5 are connected through hockey stick-like vertical webs 15 to the transverse struts 8 located in the adjacent horizontal planes.

Figure 3:
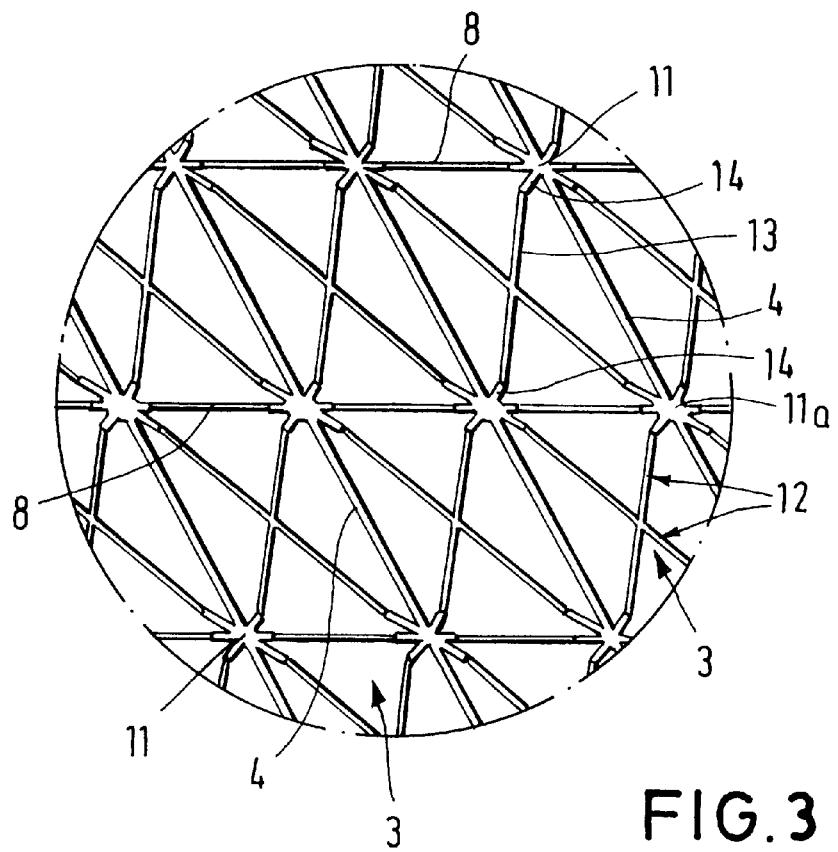
FIG. 3 is an illustration, on an even larger scale, of detail III of FIG. 2.

As can be seen in FIGS. 2 and 3 the connection points 11*a* of the longitudinal struts 4 with the transverse struts 8 and the diagonal struts 12 located in the middle and vertical area of each mounting element 2 are enlarged to form support surfaces. In accordance with the embodiment illustrated in FIGS. 1, 5 and 6, always two adjacent mounting elements 2 are welded to each other through these connection points 11*a* and the support surfaces of the contact plates 5. For this purpose, one of the mounting elements 2 is arranged rotated by 180 degrees about a vertical axis, shown in FIGS. 1 and 5, so that the longitudinal struts 4 intersect when the contact plates 5 and the connection points 11*a* contact each other.

Figure 7:
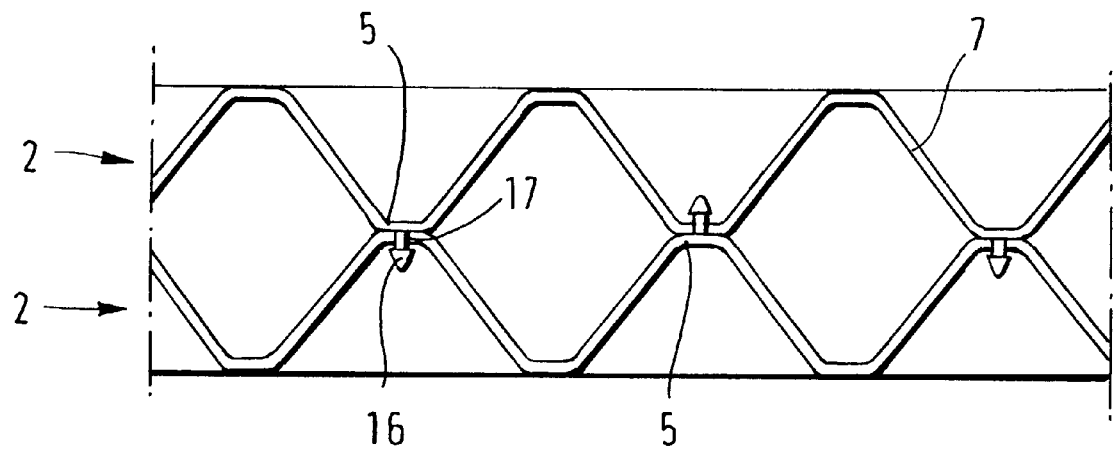
FIG. 7 is a view similar to FIG. 6, showing a different embodiment of the invention.

Instead of welding two adjacent mounting elements 2 together at the contact plates 5 and the connection points 11*a* it is also possible, in accordance with the embodiment of FIG. 7, to connect the two mounting elements 2 by means of plug-type connections. For this purpose, plugs 16 and corresponding recesses 17 are provided alternatingly at the contact plates 5 as well as at the connection points 11*a*, so that the mounting elements 2 can be simply plugged together and form a built-in packing 1 in this manner.

While specific embodiments of the invention have been shown and described in detail to illustrate the inventive principles, it will be understood that the invention may be embodied otherwise without departing from such principles.

We claim:

1. Built-in packing for a material exchange and/or heat exchange between gases and liquids, the built-in packing comprising a plurality of undulating lattice-shaped mounting elements arranged next to each other, the undulations of each mounting element forming channels extending at an angle relative to a vertical direction and extending parallel to each other, wherein channels of adjacent mounting elements intersect each other, each channel having a bottom, a longitudinal strut being mounted at the bottom of each channel, wherein the longitudinal struts have ends and contact plates mounted at the ends, the backing having upper and lower horizontal closed edge strips, wherein the contact plates are components of the edge strips, further comprising transverse struts connecting the longitudinal struts in a framework-shaped manner, and wherein the transverse struts extend in horizontal planes which extend parallel to the edge strips.

2. The built-in packing according to claim 1, wherein the channels extend at an angle of 10° to 80° to the vertical direction.

3. The built-in packing according to claim 1, wherein the channels extend at an angle of 30° to the vertical direction.

4. The built-in packing according to claim 1, wherein each connection point of a longitudinal strut to a transverse strut is connected by diagonal struts to intersection points of an adjacent longitudinal strut to transverse struts extending in adjacent horizontal planes.

5. The built-in packing according to claim 4, wherein the transverse struts and the diagonal struts are Z-shaped in a longitudinal extension thereof, each Z-shaped transverse strut and diagonal strut having a long middle portion and two end portions shorter than the long middle portion, wherein the end portion extends in vertical planes in which the longitudinal struts of each mounting element also extend.

6. The built-in packing according to claim 1, wherein the longitudinal struts have a rectangular cross-section.

7. The built-in packing according to claim 1, wherein the transverse struts have a square cross-section.

8. The built-in packing according to claim 4, wherein the diagonal struts have a wedge-shaped cross-section.

9. The built-in packing according to claim 1, wherein the contact plates have a rectangular configuration with longitudinal axes, wherein the longitudinal axes of the contact plates extend in the vertical direction.

10. The built-in packing according to claim 1, further comprising horizontal connecting struts connecting the contact plates to each other.

11. The built-in packing according to claim 10, further comprising hockey stick-like vertical struts connecting the horizontal connecting struts to the transverse struts located in the adjacent horizontal planes.

12. The built-in packing according to claim 1, wherein connection points of the longitudinal struts to the transverse struts located at least in a vertical middle area of the mounting element are enlarged to form support surfaces.

13. The built-in packing according to claim 1, wherein two adjacent mounting elements are welded together at the contact plates.

14. The built-in packing according to claim 1, wherein two adjacent mounting elements are connected to each other at the contact plates by plug-in connections.

15. The built-in packing according to claim 1, wherein the mounting elements are of polyethylene.

16. The built-in packing according to claim 1, wherein the mounting elements are of high-density polyethylene.

17. The built-in packing according to claim 1, wherein the mounting elements are of polypropylene.

* * * * *